United States Patent [19]

Nissen

[11] Patent Number: 4,607,820
[45] Date of Patent: Aug. 26, 1986

[54] ROTATING GATE VALVE

[76] Inventor: Rudolf F. Nissen, 3639 Pescadero Rd., Pescadero, Calif. 94060

[21] Appl. No.: 735,676

[22] Filed: May 20, 1985

[51] Int. Cl.[4] .......................................... F16K 31/524
[52] U.S. Cl. .................................. 251/251; 251/263; 251/287; 251/313
[58] Field of Search ............... 251/203, 204, 251, 252, 251/257, 258, 262, 263, 301, 303, 304, 309, 315, 317, 287, 313; 74/55, 56, 57

[56] References Cited

U.S. PATENT DOCUMENTS

| 14,620 | 4/1856 | Smith | 251/301 |
|---|---|---|---|
| 477,392 | 6/1892 | Weber | 251/301 |
| 1,951,878 | 3/1934 | Lundgren | 251/203 |
| 2,431,593 | 11/1947 | Strike | 251/258 |
| 2,534,577 | 12/1950 | Courtot | 251/258 |
| 2,803,426 | 8/1957 | DeZurik | 251/309 |
| 3,408,040 | 10/1968 | Kraft | 251/203 |
| 3,567,181 | 3/1971 | Kraissl, Jr. | 251/309 |
| 4,173,328 | 11/1979 | Karbo | 251/309 |

FOREIGN PATENT DOCUMENTS 1082376 12/1954 France .............................. 251/317

Primary Examiner—G. L. Walton
Attorney, Agent, or Firm—Michael L. Harrison

[57] ABSTRACT

A rotating gate valve for access to vacuum chambers, and the like, employs a rotating gate member which is alternatively aligned to cover or to uncover a slot in a concentric valve body, the ends of which are sealed and serve as supports for a shaft. Eccentric lobes on the shaft engage corresponding cam surfaces on a gate member causing it to be urged into high force contact with the body when sealing of the chamber is desired.

10 Claims, 6 Drawing Figures

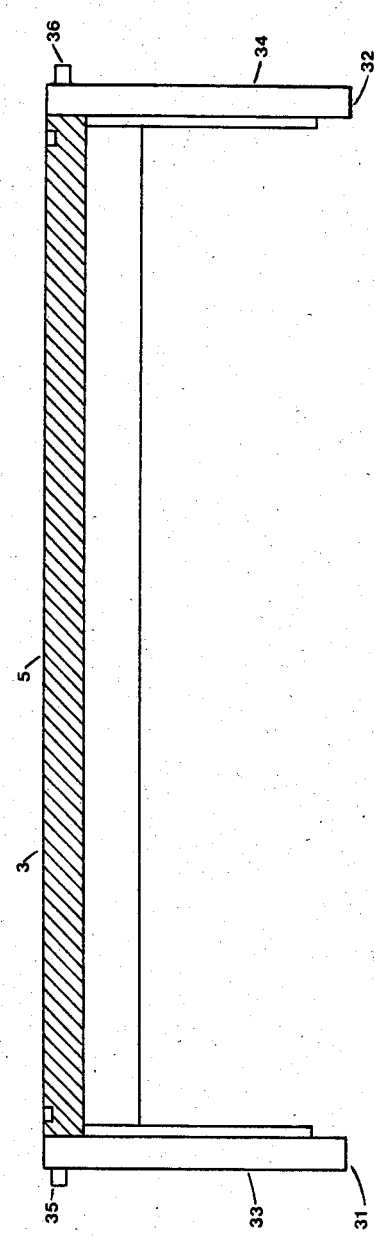
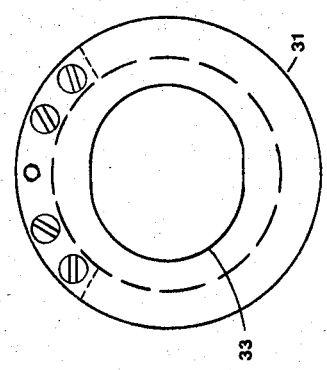
FIG. 3B
FIG. 3A

ROTATING GATE VALVE

BACKGROUND OF THE INVENTION

1. Field of the Invention

The present invention relates to the field of pressure vessel access valves and, in particular, to valves for access to vacuum deposition chamber and the like.

2. Prior Art

In numerous industrial processes, scientific research and instrumentation applications it is necessary to introduce specimens or work in process into a controlled atmosphere. In industrial processes the controlled atmosphere is frequently at reduced atmospheric pressure ranging from partial atmosphere to hard vacuums. The materials to be treated are placed in a vacuum chamber in which there are various source materials available for plasma etching, sputtering, ion implantation and similar processes.

In research instrumentation applications, the vacuum environment may be the interior, for example, of an electron microscope, a mass spectrometer, or the like.

Where the process requires the introduction and removal of materials at a rapid rate, it is necessary that the chamber access port be one which can be readily opened for passage of the materials. At the same time, however, it is desired to maintain the atmosphere of the process apparatus, or the interior of the scientific instrument, free from intrusion of impurities in the ambient atmosphere into the interior of the apparatus. For some application, of course, the high vacuum environment is fundamental to operation.

The intrusion of ambient atmosphere into the controlled atmosphere of the apparatus or instrument causes the introduction of contaminants or a change in the pressure which must be then reestablished before the process can continue. If the chamber must be opened to the surrounding atmosphere each time that a specimen is introduced, the overall operation time increased to unacceptable levels. It is, for example, a time consumming and energy-wasting process to allow the interior of the chamber to stabilize to ambient pressure and then to reestablish the vacuum which is necessary for the continuation of the process each time that material is introduced into or taken out of the chamber.

To avoid this time and energy wastage, the apparatuses and instruments are almost invariably equipped with a load lock device which allows a transition of materials from the ambient to the interior of the chamber with but a slight loss in time and with virtually no contamination of the atmosphere inside the chamber. These devices operate, in general, by providing between the ambient and the chamber, an intermediate pressure chamber of small volume.

In operation the load lock has normally closed doors on either side of the chamber, one door communicating with the ambient and the other side communicating with the interior of the chamber. Under no conditions are both doors opened simultaneously. Thus, by controlling the timing of the opening of the doors, a seal of the interior of the chamber can be maintained.

In general terms, the load lock operates by first opening the door which communicates with the ambient, and placing within the chamber the material or objects to be inserted into the main chamber. The first door is then closed and sealed following which the intermediate chamber is pumped to a pressure equivalent to that of the interior of the apparatus or instrument. When pressure equilibrium is achieved, the second door is opened and the materials or objects are passed into the interior of the chamber for further processing.

While the principles of operation of the load lock are straightfoward, as stated, the successful implementation of the principles have posed problems of design which have heretofore not been satisfactorily solved.

A flaw of the prior art designs, for example, has been that they almost universally are constructed having an excessively large interior volumn for the operation of the intermediate chamber. In addition, because the valve mechanism itself requires some space in which to operate, it has been a drawback of previous designs that the volume of "dead" space in the valves has been larger than necessary, thereby contributing to a very much greater than necessary pumping time in order for the lock chamber's pressure to equalize to that of the equipment chamber.

One example of the prior art design includes a simple flap valve which simply consists of a flat plate hinged to pivot to an open or to a closed position over a matching opening against which the flat plate seals the opening against atmosphere intrusion or extrusion. To insure that the seal is adequate, of course, requires a fair amount of pressure against the opening and thereby complicates the design of the valve and requires that its structure be mechanically rigid. These factors result in increased bulk and weight and of course add to complexity and cost. Most importantly, the flap valve is a valve design which cannot be easily optimized for minimum dead space.

Another prior art valve design is a variation of the conventional blade valve which is commonly found in fluid systems. Again, this type of valve is large and bulky and, because the blade slides in a direction perpendicular to the direction of flow of gas through the valve and in a direction which causes a sliding motion with respect to the opening to be sealed, the blade valve is difficult to seal adequately and requires elaboration of the design beyond the simple principle of operation described, in order to artificaly produce the required pressure of the blade against the opening necessary to the sealing effect desired. This in turn creates a design having high wear characteristics and which requires replacement of worn parts on a frequent basis.

Finally, the prior art valve designs, because of their large physical size, require transport devices capable of spanning a larger space than is otherwise necessary. Increasing the size of the transport mechanism has the drawback of increasing still more the size of the load-lock chamber and valves in order to accommodate the larger tansport device. A copending patent application for example, describes a transport mechanism having a high degree of space usage efficiency which would be difficult or impractical to use with the prior art valves.

SUMMARY OF THE INVENTION

A need exists therefore for a compact, low inherent volume, easily operable valve having excellent sealing characteristics. It is desirable that the valve have a mechanically simple configuration which is rugged but inexpensive to manufacture and readily capable of disassembly for cleaning and seal renewal. It is desirable also that the valve be designed so that the seals are subjected to minimum abrasion and therefore have long life.

The present invention accomplishes these and other objects by providing a housing having a cylindrical cavity with two elongated horizontal ports communicating to the outside air through opposite sides of the cavity. Within the cavity is located a rotor and a gate. Initially, a gate, which matches one of the ports, is out of the line of sight between the ports. As the rotor is turned, the eccentric cam lobes on each end of the rotor press against a matching, co-operating cam follower surface in each end of the gate. For the first approximately one-half of its rotational travel, the rotor turns along with the gate. As the gate reaches its closed position, guide pins riding in a slot reach the end of their travel thereby arresting further rotation of the gate itself. The rotor continues to travel, however, thereby causing engagement of the high point of the cam lobes with the low point of the cam follower surfaces on the ends of the gate. As the gate nears the end of its rotational travel, which is approximately one half of the rotational travel of the rotor, the cam surfaces cooperate to urge the gate valve toward a side of the cavity, thus causing the gate to cover one of two diametrically-opposed access ports. Sealing is assured by an "O"-ring seal which is slightly larger in dimension than the port and which rests on a surface of the body in the vicinity of the port opening, compressed under the pressure created by operation of the cam and cam follower, which pressure continues to increase as the rotor turns through its full rotation.

These and other details of the operation of the present invention are described in the within specification and the accompanying drawings in which:

BRIEF DESCRIPTION OF THE DRAWINGS

FIG. 3 is a side view of the gate showing a portion of the gate's cover in section.

DESCRIPTION OF THE PREFERRED EMBODIMENT

Figures 1, 2:
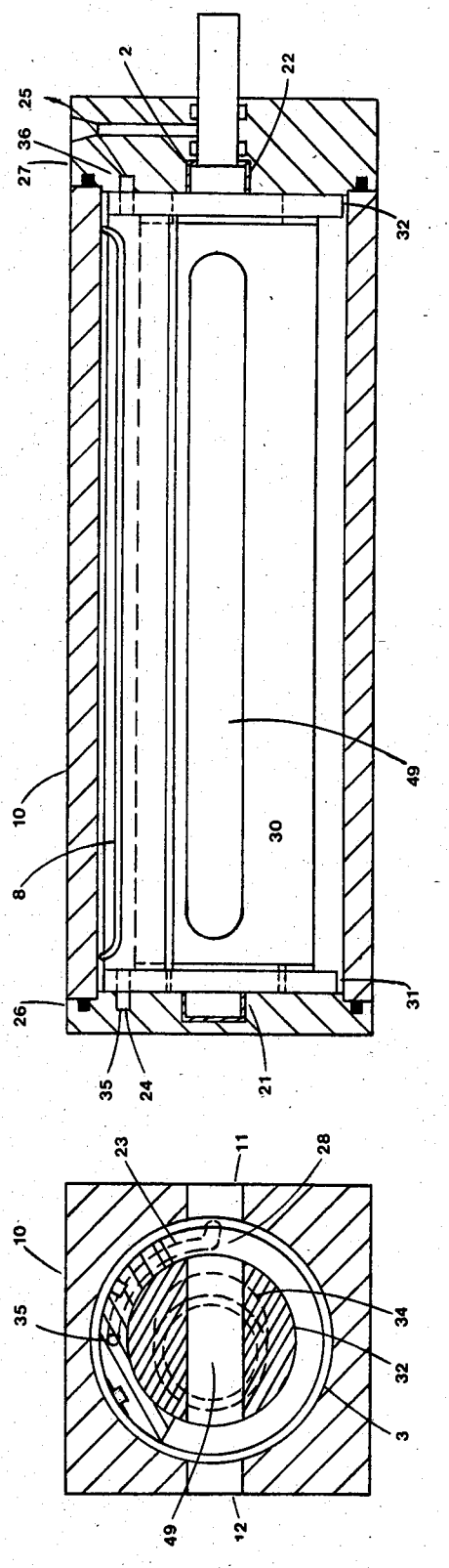
FIG. 1 is a view of the gate valve assembly including a partially sectional view of the housing and showing the rotor and gate installed.
FIG. 2 is an end view of the assembly of FIG. 1 showing the housing, the rotor and the gate in section.

Referring now to FIG. 1, there are shown the main elements of the gate valve assembly 1 in accordance with the present invention. The main elements include a housing body 10 with end plates 25 and 26 making up a housing assembly, a rotor 4 and a gate 3. Rotor 4 and gate 3 are essentially concentrically arranged with the rotor 4 mounted at the precise geometrical axis of the cylindrical cavity 13 of the housing body 10.

In FIG. 2 by means of an end view of the assembly of FIG. 1 there may be seen in section the main elements described above and the orientation of the elements with respect to the goemetrical axis of the cylindrical cavity 13. In both figures the valve is in its open position.

With the valve in its open position, it may be seen, by viewing FIGS. 1 and 2 together, that alignment of the ports 11 and 12 with the port 40 of rotor 4 allows unobstructed passage through the housing assembly so that opposite sides of the assembly are in communication.

To close the valve, the cover 5 of gate 3 is rotated, clockwise in FIG. 2, into the closed position in which the cover rests at a position approximately 90 degrees from its beginning position in FIG. 2. Once in the closed position, "O"-ring 8 is aligned with the port 11 and, when urged into contact with the housing 10 as is explained below, effectively seals port 11 from further communication with port 12 through the remainder of the assembly.

Figure 5:
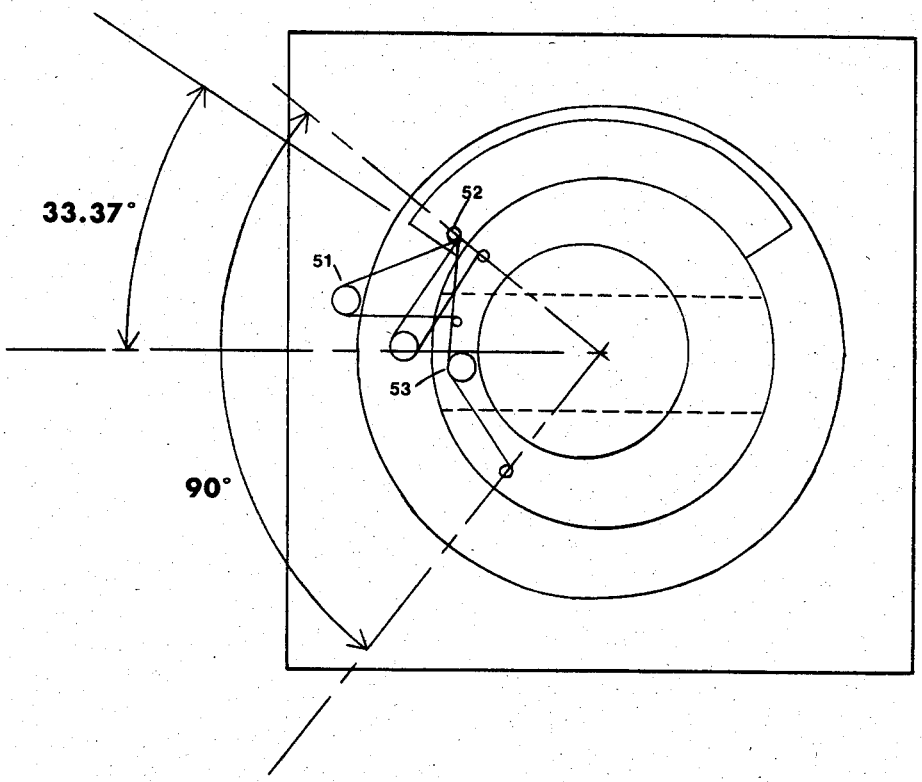
FIG. 5 is a diagram showing the relative rotations of the rotor and the gate, and the operation of the spring connecting the rotor and the gate, in accordance with present invention.

Operation of the valve may be best understood by referring simultaneously to FIGS. 1, 2 and 5. In its "rest" or "open" position, rotor 4 is completely aligned with the housing ports 11 and 12 and eccentric cams 43 and 44 are at their most distant position from port 11. As the valve is closed initially, gate 3 and rotor 4 turn in unison without slippage between them. Thus, the relative positions of cams 43 and 44 to cam follower surfaces 33 and 34 of the gate 3 remain uneffected. Rotation in unison is assured by the operation of spring 51, visible in FIG. 5, which, until restrained, remains in its essentially closed, minimum expansion position.

Upon rotation of the gate 3 through an angular displacement of approximately 90 degrees, however, pins 35 and 36 of FIG. 3, each riding in slots 23 and 24 respectively, reach the limit of their rotational travel which limit is defined by an abrupt turn in slots 23 and 24, thus causing the rotational displacement of gate 3 to be limited. At this point, rotor 4 is continued in its rotational displacement causing the cam surfaces 43 and 44 to engage the follower surfaces 33 and 34 and in turn causing the high point of the cam surfaces to urge the follower surfaces to the right in FIG. 2 causing "O"-ring 8 to seal against the interior of the cylindrical housing 13 of housing body 10.

As the gate reaches its closed position, spring 51 encounters resistance due to the stoppage of rotation of gate 3 while rotor 4 continues its rotation thereby causing the spring 51 to elongate. As the rotation of rotor 4 continues, the cam surfaces 43 and 44 are moved further to the right in FIG. 2 until, at 180 degrees of rotation from its original position, the cam surfaces have become displaced to their maximally rightward position thereby pushing gate cover 5 to a position flush against the interior of the cylindrical cavity 13 and maximally compressing "O"-ring 8 against the interior of the cylindrical cavity thereby effectively sealing port 11.

At its maximum rotation, rotor 4 causes maximum tension on spring 51 by streching the spring toward the maximum elongation on the gate 3. However, the gate is held firmly in position by means of the much stronger force of the cam surfaces 43 and 44 against the eccentric inner walls of cam follower surfaces 33 and 34 of cam plates 31 and 32. Upon opening of the valve, however, as the peaks of the lobes of cam surfaces 43 and 44 are rotated away from their maximally rightward position in FIG. 2, the spring force becomes influential and causes the gate to be urged away from port 11 thereby breaking the seal and causing the gate to move slightly toward the center of the cylindrical cavity. This frees the gates from further contact with the interior of the cylindrical cavity 13 and allows the valve to operate smoothly back to the open position. The force of spring 51 again provides the coupling between rotation of rotor 4 and gate 3 during this phase of movement.

Since the spring forces required to position the cover 5 in the absence of contact between the cover 5 and the interior of the cylindrical cavity 13 are not great, the spring force is not required to be great. On the other hand, it must be of a sufficient strength to cause separation of the "O"-ring seal from the interior of the cylindrical cavity 13 at the time the valve is operated to its open position from a closed position.

During an opening operation, disengagement of the "O"-ring seal 8 of cover 5 from the interior of the cylindrical cavity is also assisted by the effect of the cam lobes 43 and 44 contacting the end of the major axis of the ellipsoid of the cam follower surfaces 33 and 34 of the cam plates 31 and 32. When the rotor 4 has traveled through approximately ¼ of the revolution the cam lobes begin to engage the end of the follower ellipse, the leftward most surface of FIG. 3B. Under the influence of the cam forces, as well as the spring 51, the gate is urged away from the port 11 and is caused to rotate in unison again with rotor 4 until the gate is completely displaced from its closed position. As the rotor continues its counterclockwise rotation, gate 3 is urged back into its open position, at the top of its rotation in FIG. 2. Again, guide pins 35 and 36 running in slots 24 and 25 maintain the alignment of gate 3 with respect to the cavity walls 13, preventing interference by friction between the gate and cavity walls.

Rotor 4 has main elements consisting of a body 40, journals 41 and 42, cam surfaces 43 and 44, and operating shaft 45. The body 40 is preferably symmetrical and cylindrical about the geometrical center of the axis of rotation of rotor 4. Journals 41 and 42 are concentric with the axis of rotation. Operating shaft 45 is also concentric with the axis of rotation.

Cam surfaces 43 and 44 consist of short cylinders mounted eccentrically with respect to the axis of rotation. The displacement of the geometrical axis of the cam surfaces with respect to the axis of rotation is equal to the distance of travel required to insure proper engagement of "O"-ring 8 with the interior walls of the cylindrical cavity 13. The diameters of the eccentric cam surfaces 43 and 44 are equal to that of a minor axis of the elipse 33 and 34, of end plates 31 and 32 respectively, of gate 3.

Figure 4:
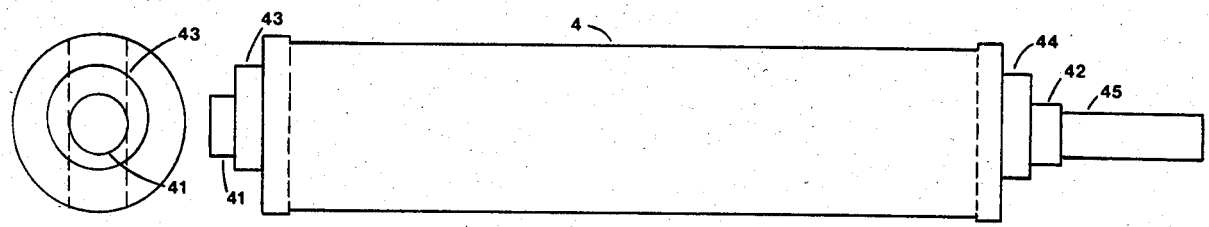
FIG. 4 is a side view of the rotor in accordance with the present invention.

The port 49 shown in cross section in FIG. 2 and in hidden line depiction in FIG. 4 is preferably of the same dimensions as the corresponding ports 11 and 12 in FIG. 2 although this is not technically necessary. In theory, the port side 49 may be any size, which is larger than the size of the access ports 11 and 12 and, in fact, the motion required for operation of rotor 4 in order to transmit its movement from one end to the other may be easily accomplished by any variety of structural shapes including, without intending any limitation, a single narrow rod which connects the two cam surfaces together without interference with the access path between ports 11 and 12. In practice this is an undesirable arrangement because it results in a quantity of "dead" space which must be evacuated when it is desired to change pressures on one side of the valve from the other. In other words, evacuation from port 12 under this circumstance would require evacuation not only of the "live" space which is required to pass articles through and to operate the gate closure mechanism, but also the dead space in the remainder of the cavity plus the dead space not consumed by the volume of the rotor 4. Therefore it is preferable that the rotor 4 volume occupy as much of the dead space as is possible in order to eliminate the need for evacuation of larger than necessary volumes.

Gate 3 consists of a cover 5 attached to two cam plates 31 and 32. Cover 5 is a portion of a cylindrical section having an outer radius substantially identical to the radius of cylindrical cavity 13 so that, as the cover 4 is urged toward the interior of the cylindrical cavity 13, the two surfaces are touching at substantially all points.

Cam follower surfaces 33 and 34 in cam plates 31 and 32, although they appear to be ellipsoidal in shape, are actually ovals having constant radii of curvature at either end of their major axis and having a small straight section intercepting the minor axis and connecting the radii together. The minor axis diameter is a snug fit to the diameter of cams 43 and 44 and the radius of each end of the oval is substantially equal to the diameter of the minor axis.

It will be appreciated that the principles taught in this description are those which are preferred, but that other variations of the invention set forth are practicable within the scope of the invention which is set forth in the following claims.

What is claimed is:

1. A pressure-tight valve for alternately sealing and opening pressure-tight chambers, comprising:

a housing having an elongated cylindrical cavity and having a first and second access port located on substantially opposite sides of the axis of rotation of the cavity, each port being substantially aligned with the other, the first of which ports is surrounded by a seat area;

a rotor, concentrically and rotatably mounted within the cylindrical cavity of the housing, and constructed such that there exists an open area corresponding in dimension and in location to the ports in the housing and so positioned that the openings of the housing and the open area of the rotor are substantially aligned during a portion of the rotor's rotation with respect to the housing, and having at each side of the open area two eccentrically-shaped cam lobes, the high points of which are generally orthogonal to the the plane of the effective area of the opening of the rotor;

a gate, having a cover element which is shaped substantially on a section of a cylinder the outside diameter of which cylinder is substantially the same as the diameter of the cylindrical cavity, and having an open position, in which the cover does not obstruct the passage formed between the first and second ports, and a closed position in which the cover entirely covers the first port and rests against the seat area of the first port, and having two end plates rigidly affixed to said cover, each end plate having a cam follower surface, adapted to engage the cam surfaces of the rotor, which cam follower surfaces are parallel to one another and are substantially perpendicular to the effective area of the opening of the port when the gate is in its closed position, which gate lags the rotation of the rotor with respect to the cylindrical cavity during the initial portion of rotation from the closed position of the gate and during the final rotation of the rotor toward the closed position, said gate being free to move away from the wall of the cylindrical cavity when the cam followers are disengaged from the cam surfaces.

2. The apparatus of claim 1 further comprising first means for limiting the rotation of the gate so that when restrained by said limit of rotation, the gate is substantially aligned with and covering one of the openings of the cylindrical housing.

3. The apparatus of claim 2 further comprising:

second means for limiting the rotation of the gate such that at the second limit of the gate's rotation, the gate cover is held at a position which is out of the path of alignment of the two openings of the housing.

4. The apparatus of claim 3 further comprising:

spring means for urging the gate to rotate with the rotor, said spring means having a force sufficient to overcome the friction and other incidental forces operating to restrain the gate's rotation, but having insufficient force to overcome the force exerted by the means for limiting the rotational travel of the gate.

5. The apparatus of claim 4 in which the first means for limiting the movement of the gate's rotation at the first limit prohibits further rotation but allows lateral movement of the gate towards and from the opening in the housing.

6. The apparatus of claim 2 in which the first means for limiting the movement of the gate's rotation prohibits further rotation but allows lateral movement of the gate towards and from the opening in the housing.

7. The apparatus of claim 6 in which the first means for limiting the movement of the gate's rotation at the first limit prohibits further rotation but allows lateral movement of the gate towards and from the opening in the housing.

8. The apparatus of claim 2 in which the first means for limiting the movement of the gate's rotation at the first limit prohibits further rotation but allows lateral movement of the gate towards and from the opening in the housing.

9. A pressure-tight valve for alternately sealing and opening pressure-tight chambers, comprising:

a housing having an elongated cylindrical cavity and having a first and second access port located on substantially opposite sides of the axis of rotation of the cavity, each port being substantially aligned with the other, the first of which ports is surrounded by a seat area;

a rotor, concentrically and rotatably mounted within the cylindrical cavity of the housing, and constructed such that there exists an open area corresponding in dimension and in location to the ports in the housing and so positioned that the openings of the housing and the open area of the rotor are substantially aligned during a portion of the rotor's rotation with respect to the housing, and having at each side of the open area two eccentrically-shaped cam lobes, the high points of which are generally orthogonal to the plane of the effective area of the opening of the rotor;

a gate, having a cover element which is shaped substantially on a section of a cylinder the outside diameter of which cylinder is substantially the same as the diameter of the cylindrical cavity, and having an open position, in which the cover does not obstruct the passage formed between the first and second ports, and a closed position in which the cover entirely covers the first port and rests against the seat area of the first port, and having two end plates rigidly affixed to said cover, each end plate having a cam follower surface, adapted to engage the cam surface of the rotor, which cam follower surfaces are parallel to one another and are substantially perpendicular to the effective area of the opening of the port when the gate is in its closed position, which gate lags the rotation of the rotor with respect to the cylindrical cavity during the initial portion of rotation from the closed position of the gate and during the final rotation of the rotor toward the closed position, said gate being free to move away from the wall of the cylindrical cavity when the cam followers are disengaged from the cam surfaces;

first means for limiting the rotation of the gate so that when restrained by said limit of rotation, the gate is substantially aligned with and covering one of the openings of the cylindrical housing, and;

spring means for urging the gate to rotate with the rotor, said spring means having a force sufficient to overcome the friction and other incidental forces operating to restrain the gate's rotation, but having insufficient force to overcome the force exerted by the means for limiting the rotational travel of the gate.

10. The apparatus of claim 9 in which the first means for limiting the movement of the gate's rotation prohibits further rotation but allows lateral movement of the gate towards and from the opening in the housing.

* * * * *